United States Patent [19]

Nielsen et al.

[11] Patent Number: 4,545,126

[45] Date of Patent: Oct. 8, 1985

[54] METHOD AND APPARATUS FOR CHECKING TOOTHED ARTICLES

[75] Inventors: John C. Nielsen, Mt. Prospect; Henry J. Flair, Franklin Park, both of Ill.

[73] Assignee: Illinois Tool Works Inc., Chicago, Ill.

[21] Appl. No.: 569,626

[22] Filed: Jan. 10, 1984

[51] Int. Cl.⁴ .............................................. G01B 5/20
[52] U.S. Cl. ........................ 33/179.5 R; 33/179.5 D; 33/199 R
[58] Field of Search ................... 33/179.5 R, 179.5 D, 33/179.5 A, 199 R, 147 M, 199 B, 179.5 C

[56] References Cited

U.S. PATENT DOCUMENTS

| | | | |
|---|---|---|---|
| 1,701,183 | 2/1929 | Hansen | 33/179.5 D |
| 2,726,455 | 12/1955 | Saari | 33/179.5 R |
| 2,726,456 | 12/1955 | Pergande | 33/179.5 R |
| 2,735,189 | 2/1956 | Bjornberg | 33/179.5 R |
| 2,770,050 | 11/1956 | Johnson | 33/199 R |
| 3,044,176 | 7/1962 | Candee et al. | 33/179.5 C |
| 3,318,011 | 5/1967 | Johnson | 33/147 M |
| 3,371,422 | 3/1968 | Müler | 33/179.5 R |

*Primary Examiner*—Willis Little
*Attorney, Agent, or Firm*—David I. Roche; Thomas W. Buckman

[57] ABSTRACT

A method and apparatus for checking toothed articles such as splines. A spline is rotatably supported in a cradle, and a pair of discs, one of which is axially moveable, the other of which is axially fixed, are brought into engagement with generally parallel and oppositely directed teeth of the spline. The discs are of the same hand and are rotated in unison causing rotation of the spline in the cradle. Relative movement of the discs is monitored to provide a succession of span measurements in order to provide information which can be used to sort splines according to their deviation from designed dimensions.

12 Claims, 3 Drawing Figures

METHOD AND APPARATUS FOR CHECKING TOOTHED ARTICLES

BACKGROUND AND SUMMARY OF THE INVENTION

The present invention is directed to a method and apparatus for inspecting toothed articles such as splines. The basic technique of the present invention involves a rapid succession of span measurements which can be used to determine the quality of a workpiece.

The most common prior art method for determining the quality of splines involves the use of "go and no-go" gauges. In this method a "go" gauge having an opening which corresponds to the maximum tolerable spline dimension is placed over the spline being examined. If the "go" gauge does not fit over the part being inspected, the spline is larger than the maximum allowable size. Similarly, if a "no-go" gauge with an opening corresponding to the minimum allowable part size fits over a part being examined, the part is too small. Obviously the use of such gauges is tedious and it requires extensive manual labor which is costly and inefficient. Another disadvantage is that wear of the gauges necessitates their replacement. This is costly since each guage must be made to very precise dimensions. Furthermore, the timing of the replacement is a subjective decision which leads to variability in the inspection process.

Applicant's invention greatly simplifies the inspection of splines. In the Applicant's invention, a spline is rotatably supported in a cradle (or between centers). A pair of checking discs of the same hand are mounted on a pivoting arm. The two discs are mounted to a common rotating shaft carried by the pivoting arm. One of the discs is axially fixed and the other slides along the shaft. The discs are keyed to the rotating shaft and rotate in unison. When the discs are brought into engagement with the workpiece, it rotates about its axis in the cradle. The discs engage generally parallel oppositely directed tooth profiles on the workpiece. The discs are threaded with one side of the thread being straight for engagement with the spline teeth. While rotating, relative movement of the sliding discs is monitored by a linear voltage differential transducer. A continuous record of the movement of the sliding disc provides a continuous measurement which includes a succession of span measurements which can be used to sort workpiece splines according to their derivation from designed dimensions.

The objects and advantages of the present invention will be apparent upon a reading of the following specification read in conjunction with the accompanying drawings.

DETAILED DESCRIPTION OF THE INVENTION

Figure 1:
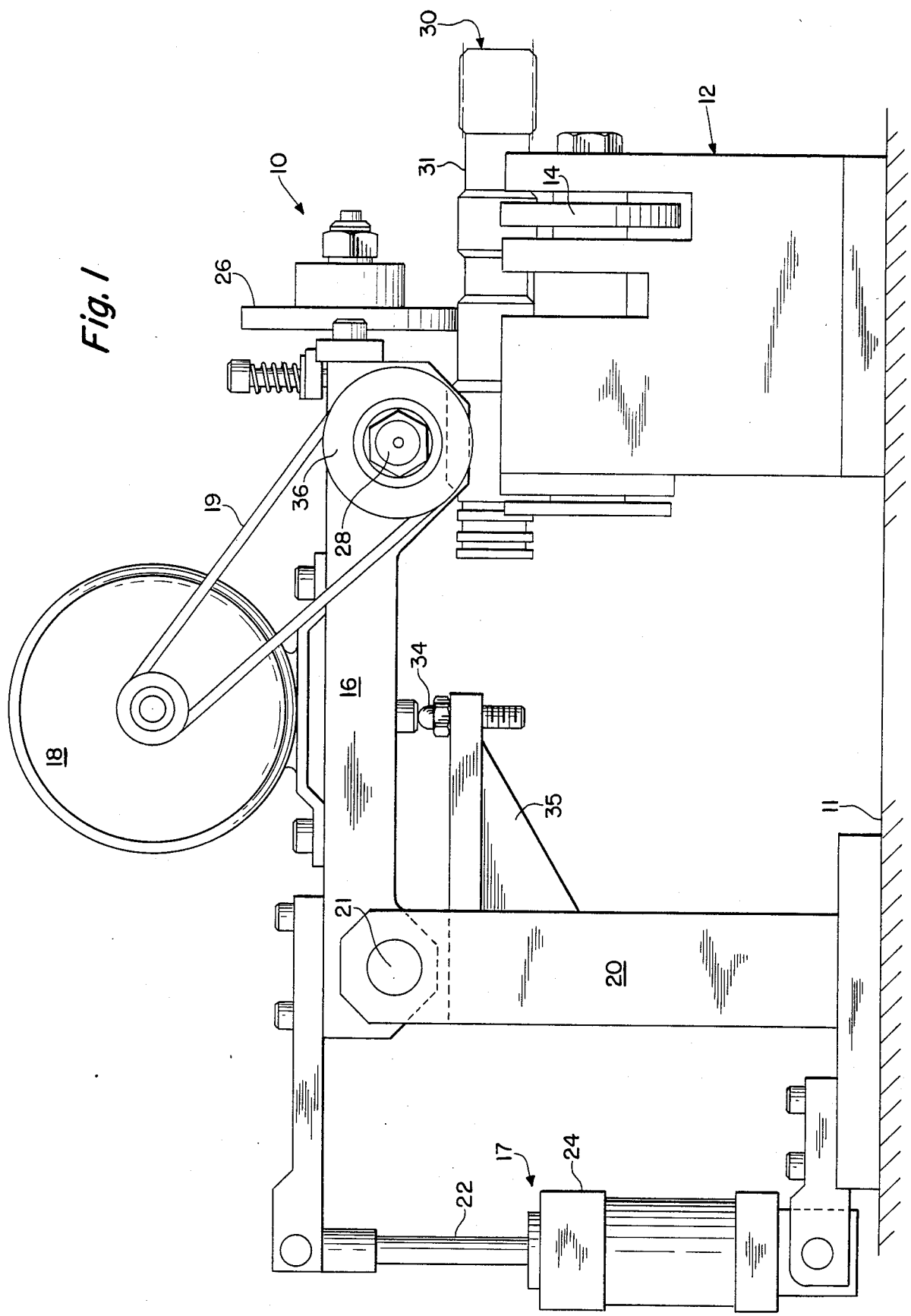
FIG. 1 is an elevational view of a spline checking apparatus of the present invention.

Referring now to the drawings, wherein like parts are designated by the same numerals throughout the various figures, an apparatus 10 is mounted on a base 11, and includes a cradle assembly 12, an arm support 20 and a hydraulic actuator 17. The apparatus 10 further includes a pivoting arm 16 mounted on the support 20. The arm 16 pivots about point 21. A motor 18 is mounted on the arm 16, and is connected by a belt 19 to a pulley 36. A roller 26 is resiliently mounted on the end of the arm 16. A bracket 35 is mounted on the arm support 20. A stop 34 is positioned on the end of the bracket 35, and prevents movement of the arm 16 beyond a predetermined point.

The cradle assembly is comprised of a plurality of rollers 14. As a workpiece spline 30 is placed into the assembly 12, the actuator 17 causes the arm 16 to move in the direction of the workpiece spline 30. The rollers 14 and 26 preferably bear upon smooth portions 31 of the spline 30.

Figure 2:
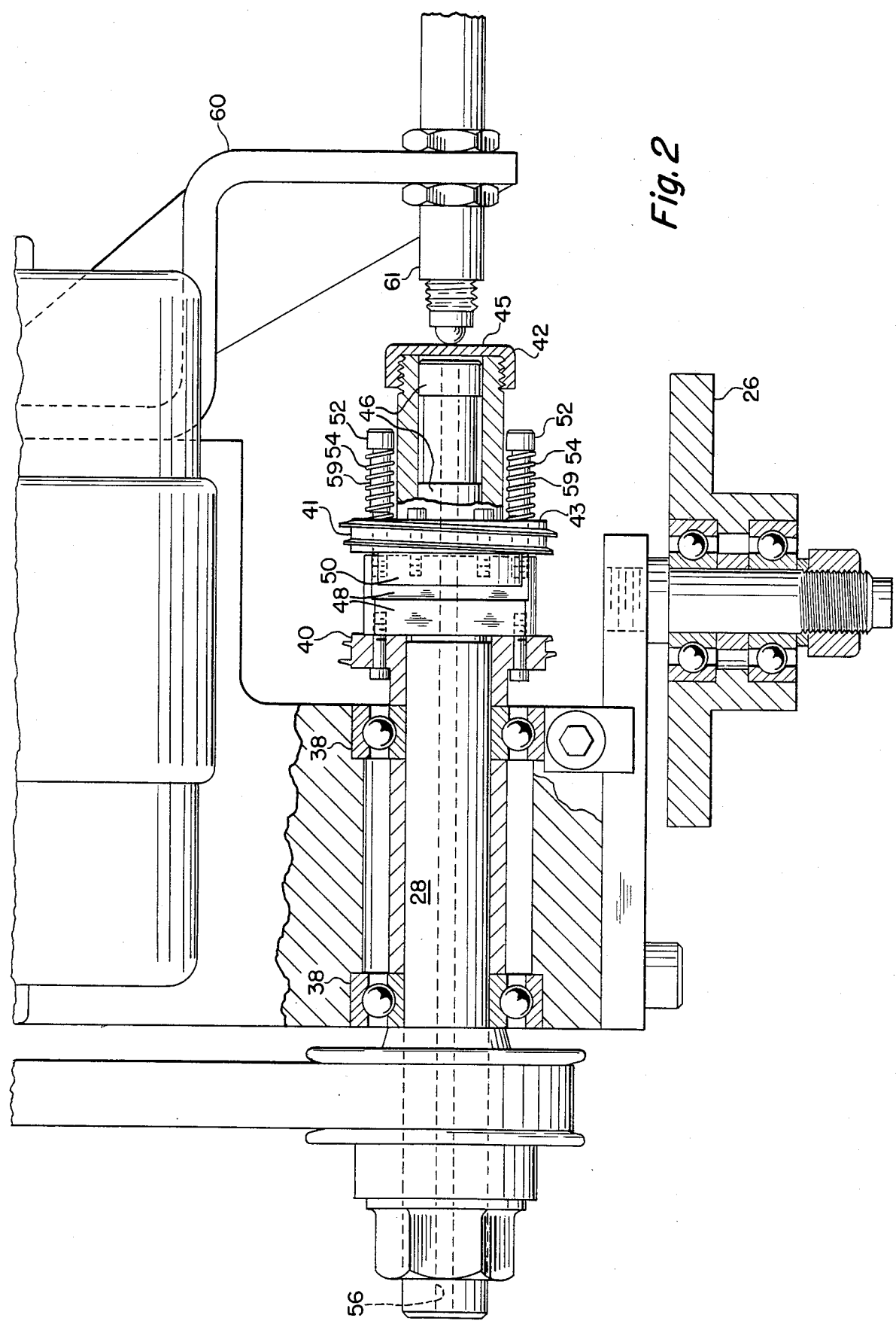
FIG. 2 is a plan view in partial section illustrating the way in which the discs are mounted on the pivoting arm.

As can be seen in FIG. 2, a shaft 28 carries an axially fixed disc 40 and an axially moveable disc 41. The shaft is mounted on the arm 16 and is journalled through a pair of bearings 38. The shaft 28 is driven by the motor 18 through the belt 19 and the pulley 36. The shaft 28 includes flats 48. Mounting blocks 50 are bolted to the discs 40 and 41, respectively. The blocks 50 abut the flats 48 so that rotation of the shaft 28 causes rotation of the discs 40 and 41. The disc 40 is axially fixed, and the disc 41 slides along bearing surfaces 46. The mounting of sliding disc 41 includes a spring 54 which is compressed between the head of the bolt 52 and the flange 43 of the disc 41. The spring 54 allows resilient axial movement of the sliding disc 41. An end cap 42 with a smooth surface 45 is mounted at the end of sliding disc 41. A bracket 60 is carried by the arm 16. A linear voltage differential transducer (LVDT) 61 is mounted on the bracket 60 in alignment with the axial movement of the sliding disc 41. The LVDT 61 measures the movement of the sliding disc 41 along the shaft 28.

The shaft 28 is provided with a central bore 56 which extends through the entire length of the shaft 28. The bore 56 provides a conduit for pressurized fluid which is used to retract the sliding disc 41 in preparation for engagement of the discs 40 and 41 with a workpiece. A sleeve 59 surrounding the shank of the bolt 52 limits the retracting motion of the sliding disc 41.

Figure 3:
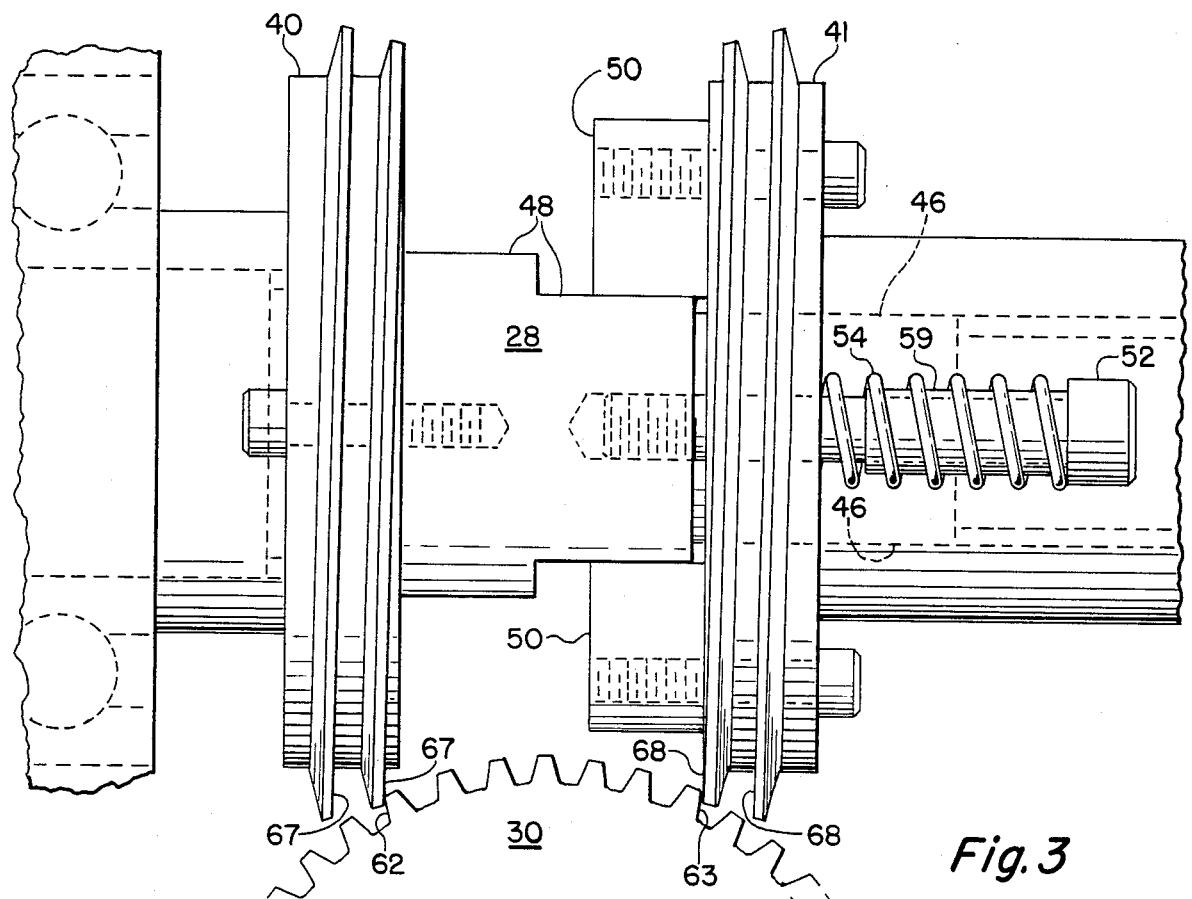
FIG. 3 is a side elevational view in partial section showing the discs in engagement with a workpiece spline.

FIG. 3 is an enlarged view of the discs 40 and 41 as they engage a workpiece spline 30. The discs 40 and 41 are of the same hand and preferably have tooth profiles which include surfaces 67 and 68, respectively, which are generally perpendicular to the axis of the discs. The surfaces 67 and 68 face each other and are adapted to engage the generally parallel and oppositely directed spline tooth surfaces 62 and 63. The tooth surfaces 62 and 63 define a typical scan. The term span as used herein refers to the distance between oppositely facing tooth surfaces which are nearly parallel. In the spline shown in FIG. 3, the surfaces defining a span are on teeth which are approximately 60 degrees apart and separated by seven full spline teeth. The straight sided, generally flat surfaces 67 and 68 of the discs 40 and 41 provide an accurate means for measuring the spans of the spline 30. Rotation of the discs 40 and 41 causes rotation of the spline 30, and continuous monitoring of the movement of the sliding disc 41 provides a succession of span measurements of the spline 30.

The span measurements provide useful information about the tooth spacing, tooth thickness, index variation and ovality of the part being inspected, particularly when the measurements are recorded on a strip chart. Use of electronic controls enables the apparatus to provide successive span readings for 360 degrees of workpiece rotation. The greatest span and span variation are combined and compared to preset limits. After making such comparisons, the apparatus can be programmed to automatically indicate whether the spline is good (within limits), undersize, or oversize. The classification directly correlates with go and no-go ring gauge fits.

The above description of the preferred embodiment is but one example of the many alternatives, variations and modifications which are intended to be within the scope of the apended claims.

We claim:

1. An apparatus for checking an article of the type including splines and gears, said apparatus comprising means for holding said article translationally stable while allowing rotation of said article about its axis, means for simultaneously rotating said article and for engaging teeth thereof including two separated externally threaded discs, said discs being rotationally fixed and axially moveable relative to one another, a first of said discs being substantially fixed along its axis, said axis being substantially transverse to the axis of said article, a second of said discs being resiliently urged toward said first disc, said first disc being adapted to engage a tooth surface on said article, said second disc being adapted to engage a second tooth surface on said article, drive means associated with said discs for axially rotating both said article and said discs upon engagement of said discs with said article, means for detecting relative axial motion of said discs during their engagement with said article.

2. An apparatus according to claim 1 wherein said means for holding said article translationally stable includes a plurality of rollers.

3. An apparatus according to claim 2 wherein said rollers define a cradle which is oriented to support said article such that its axis is horizontal.

4. An apparatus according to claim 1 wherein said discs are mounted on a pivoting arm, said arm having means at one end for causing said discs to be moved into and out of engagement with said article.

5. An apparatus according to claim 1 wherein said first and second discs are keyed to a common rotating shaft.

6. An apparatus according to claim 5 wherein said first disc is axially fixed on said shaft and said second disc is axially slidable thereon.

7. An apparatus according to claim 1 wherein each of said discs has a thread profile which includes an engagement surface which is generally perpendicular to the axis of said discs and the engagement surfaces of said discs face each other.

8. An apparatus according to claim 6 wherein said shaft includes a central through-bore adapted to serve as a conduit for pressurized fluid used to move said slidable disc in preparation for engagement of said discs with said article.

9. An apparatus for checking a toothed article such as a spline, said apparatus comprising a flat disc rotationally and axially fixed to a rotating shaft, a second disc slidably mounted and rotationally fixed to said shaft, said second disc being resiliently urged toward said first disc, means for monitoring axial movement of said second disc, whereby a continuous succession of span measurements of said article are obtained as said discs are rotated in engagement with said article.

10. A checking apparatus comprising supporting means for supporting a toothed workpiece, means for rotating said workpiece in said supporting means, means for taking a succession of span measurements of said toothed article as said article is rotated said means for rotating said workpiece and said means for taking a succession of span measurements including a pair of discs engageable with said workpiece and carried by a rotating shaft, one of said discs being rotationally and axially fixed to said shaft, the other of said discs being rotationally fixed and axially slidable on said shaft, and said means for taking a succession of span measurements includes means for monitoring relative axial movement of said discs.

11. A method of checking a toothed article such as a spline comprising the steps of:
 (a) supporting said article in a translationally stable and rotationally free position, and
 (b) rotating said article with a first disc, and
 (c) using a second disc rotated in unison with said first disc to take successive span measurements of said article.

12. A method in accordance with claim 11 wherein said discs are mounted on a pivoting arm and said article is supported in a cradle comprised of a plurality of rollers, the additional steps of placing said article in said cradle and moving said arm to cause engagement between said discs and said article.

* * * * *